US006925712B2

(12) United States Patent
Murai

(10) Patent No.: US 6,925,712 B2
(45) Date of Patent: Aug. 9, 2005

(54) METHOD OF FABRICATING A LIQUID-JET HEAD

(75) Inventor: Masami Murai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/793,895

(22) Filed: Mar. 8, 2004

(65) Prior Publication Data

US 2004/0169705 A1 Sep. 2, 2004

Related U.S. Application Data

(62) Division of application No. 10/228,269, filed on Aug. 27, 2002, now abandoned.

(30) Foreign Application Priority Data

Aug. 28, 2001 (JP) ....................................... 2001-257745
Aug. 21, 2002 (JP) ....................................... 2002-240101

(51) Int. Cl.[7] ........................... B21D 53/76; B23P 17/00

(52) U.S. Cl. ..................... 29/890.1; 29/25.35; 156/252; 156/292; 216/65; 216/66; 347/68; 347/70; 347/71

(58) Field of Search ............................. 29/25.35, 890.1; 347/68, 70, 71; 216/65, 66; 156/252, 292

(56) References Cited

U.S. PATENT DOCUMENTS 6,031,201 A * 2/2000 Amako et al. ......... 219/121.68
6,378,996 B1 * 4/2002 Shimada et al. .............. 347/70
6,616,270 B1 * 9/2003 Miyata et al. ................ 347/68

FOREIGN PATENT DOCUMENTS

JP 5-286131 11/1993
JP 11000787 A * 1/1999 ........... B23K/26/12

OTHER PUBLICATIONS

"A new device for multifunctional dosage of liquids by a free jet"; Hey, N.; Freygang, M.; Gruhler, H.; Sandmaier, H.; Zengerle, R.; Micro Electro Mechanical Systems, 1998. MEMS 98. Proceedings., on , Jan. 25–29 1998; pp. 429–431.*

* cited by examiner

*Primary Examiner*—Paul D. Kim
(74) *Attorney, Agent, or Firm*—Sughrue Mion, PLLC

(57) ABSTRACT

A liquid-jet head effective in prevention of imperfect eject such as occlusion of a nozzle, a method of fabricating the liquid-jet head, and a liquid-jet apparatus are provided. In a liquid-jet head having a passage-forming substrate on which a pressure-generating chamber communicating with a nozzle orifice is formed, a plurality of piezoelectric elements provided on one side of the passage-forming substrate via a vibration plate, each of the piezoelectric elements comprising a lower electrode, a piezoelectric layer and an upper electrode, the passage-forming substrate is provided with a communicating path communicating with one end in a longitudinal direction of the pressure-generating chamber so as to penetrate the passage-forming substrate. In addition, a penetrated portion for supplying a liquid to the communicating path is formed in a region of the vibration plate opposite to the communicating path by laser processing.

16 Claims, 8 Drawing Sheets

METHOD OF FABRICATING A LIQUID-JET HEAD

This is a division of application Ser. No. 10/228,269 filed Aug. 27, 2002, now abandoned.

BACKGROUND OF THE INVENTION

1. Field of the Invention

The present invention relates to liquid-jet heads for ejecting, methods of fabricating the same and liquid-jet apparatuses. More specifically, the present invention relates to an ink-jet recording head for ejecting ink droplets out of nozzle orifices by applying pressure to ink supplied to pressure-generating chambers communicating with the nozzle orifices for ejecting the ink droplets by use of piezoelectric elements, a method of fabricating the same and an ink-jet recording apparatus.

2. Description of the Prior Art

Typical ink-jet recording heads include vibration plates, which constitute part of pressure-generating chambers communicating with nozzle orifices for ejecting ink droplets. Such ink-jet recording heads eject ink droplets out of the nozzle orifices by deforming the vibration plates with piezoelectric elements and thereby applying pressure to the ink in the pressure-generating chambers. There are two types of the ink-jet recording heads currently put into practical use; one uses a piezoelectric actuator of a longitudinal vibration mode, which expands and contracts in an axial direction of the piezoelectric element, and the other uses a piezoelectric actuator of a flexural vibration mode.

The former type effectuates variation of volumes of the pressure-generating chambers by allowing end faces of the piezoelectric elements to abut on the vibration plates. Accordingly, it is possible to fabricate a head suitable for high-density printing. However, the former type has a problem of complicated fabrication process, because the fabrication process includes a difficult step of sectioning the piezoelectric elements into comb shapes so as to align with arrangement pitches of the nozzle orifices, and an operation for positioning and fixing the sectioned piezoelectric elements to the pressure-generating chambers.

On the contrary, the latter type effectuates formation of the piezoelectric elements on the vibration plates by a relatively simple step of attaching a green sheet of a piezoelectric material in line with shapes of the pressure-generating chambers and then baking the green sheet. However, the latter type has a problem of difficulty in high-density arrangement, because a certain area is required for utilizing flexural vibration.

Meanwhile, in order to solve the inconvenience of the recording head of the latter type, Japanese Laid-Open No. 5(1993)-286131 discloses a recording head, in which a piezoelectric material layer is formed uniformly on an entire surface of a vibration plate by use of a film forming technology, and piezoelectric elements are independently formed for respective pressure-generating chambers by sectioning the piezoelectric material layer into shapes corresponding to the pressure-generating chambers by use of a lithography process.

Moreover, such an ink-jet recording head is provided with a reservoir as a common ink chamber to the respective pressure-generating chambers, whereby the ink is supplied from the reservoir to the respective pressure-generating chambers.

Such a reservoir has been conventionally formed on a passage-forming substrate, where the pressure-generating chambers are formed, on an opposite side to the piezoelectric elements, by means of laminating a plurality of substrates. However, there has been a problem of increases in material costs and assembly costs. In addition, there has been a problem of difficulty in downsizing the head. In order to solve the foregoing problems, a structure is proposed in which a reservoir is provided on the same side of a passage-forming substrate where piezoelectric elements are formed and the reservoir communicates with pressure-generating chambers via penetrated portions formed on vibration plates.

However, in the above-described ink-jet recording head, the penetrated portions are formed by mechanically processing the vibration plates. Accordingly, there is a problem that cracks or the like are generated around the penetrated portions. Moreover, there is also a problem that fragments may fall from a portion of the vibration plate where cracks are generated if ink is filled in and ejected in the state where the cracks are generated, whereby the fragments may occlude a nozzle orifice and may cause imperfect.

Note that the foregoing problems are not limited to ink-jet recording heads for ejecting ink, but are also applicable naturally to methods of fabricating other liquid-jet heads for ejecting liquids other than ink.

SUMMARY OF THE INVENTION

In consideration of the foregoing circumstances, it is an object of the present invention to provide a liquid-jet head which prevents imperfect eject such as occlusion of a nozzle, a method of fabricating the liquid-jet head and a liquid-jet apparatus.

To solve the foregoing problems, a first aspect of the present invention is a liquid-jet head having a passage-forming substrate on which a pressure-generating chamber communicating with a nozzle orifice is formed, a plurality of piezoelectric elements provided on one side of the passage-forming substrate via a vibration plate, each of the piezoelectric elements comprising a lower electrode, a piezoelectric layer and an upper electrode. Here, the passage-forming substrate is provided with a communicating path communicating with one end in a longitudinal direction of the pressure-generating chamber so as to penetrate the passage-forming substrate, and a penetrated portion for supplying a liquid to the communicating path is formed in a region of the vibration plate opposite to the communicating path by laser processing.

According to the first aspect, since the penetrated portion is formed by laser processing, cracks and the like are not generated around the penetrated portion. Therefore, it is possible to prevent occurrence of imperfect eject such as occlusion of a nozzle, attributable to a fragment of the vibration plate being mixed into the liquid.

A second aspect of the present invention is the liquid-jet head according to the first aspect, in which dross in an amount within one-fourth of a diameter of the nozzle orifice is adhered to a peripheral portion of the penetrated portion.

According to the second aspect, even if the dross falls off and is mixed into the liquid, the dross is d out of the nozzle orifice together with the liquid. Accordingly, occurrence of occlusion of the nozzle is avoided.

A third aspect of the present invention is the liquid-jet head according to any one of the first and the second aspects, in which the penetrated portion is at least formed into any of a size as large as an open region of the communicating path on the vibration plate side and a size smaller than the open region.

According to the third aspect, the passage-forming substrate and the like are not affected upon formation of the penetrated portion by laser processing.

A fourth aspect of the present invention is the liquid-jet head according to the third aspect, in which the penetrated portion is formed into a shape along an open edge of the communicating path.

According to the fourth aspect, it is possible to form the penetrated portion having the shape along the open edge of the communicating path by means of irradiating a laser beam along the open edge of the communicating path.

A fifth aspect of the present invention is the liquid-jet head according to the third aspect, in which the penetrated portion is composed of a plurality of penetrated holes provided within the open region of the communicating path.

According to the fifth aspect, it is easily possible to form the penetrated portion by laser processing, and it is also possible to prevent deformation of the passage-forming substrate owing to heat.

A sixth aspect of the present invention is the liquid-jet head according to any one of the first to fifth aspects, in which a reservoir-forming plate including a reservoir portion communicating with the communicating path via the penetrated portion is bonded to the passage-forming substrate on a side where the piezoelectric element is provided.

According to the sixth aspect, the reservoir is constituted is the communicating path and the reservoir portion communicating with each other via the penetrated portion. Moreover, it is possible to avoid any fragments from the vibration plate being mixed into the liquid in the reservoir.

A seventh aspect of the present invention is a liquid-jet apparatus including the liquid-jet head according to any one of the first to the sixth aspects.

According to the seventh aspect, it is possible to realize an ink-jet recording apparatus capable of preventing imperfect eject and thereby improved in reliability.

An eighth aspect of the present invention is a method of fabricating a liquid-jet head having a passage-forming substrate on which a pressure-generating chamber communicating with a nozzle orifice is formed, a plurality of piezoelectric elements provided on one side of the passage-forming substrate via a vibration plate, each of the piezoelectric elements comprising a lower electrode, a piezoelectric layer and an upper electrode. Here, the method includes the steps of forming the vibration plate and the piezoelectric element on one side of the passage-forming substrate, forming the pressure-generating chamber by patterning from another side of the passage-forming substrate and forming a communicating portion to communicate with one end in a longitudinal direction of the pressure-generating chamber, and forming a penetrated portion for supplying a liquid to the communicating path in a region of the vibration plate opposite to the communicating path by laser processing.

According to the eighth aspect, since the penetrated portion is formed by laser processing, cracks and the like are not generated around the penetrated portion.

A ninth aspect of the present invention is the method of fabricating a liquid-jet head according to the eighth aspect, in which a laser beam is irradiated on the vibration plate in the step of forming a penetrated portion to effectuate processing such that dross in an amount within one-fourth of a diameter of the nozzle orifice is adhered.

According to the ninth aspect, even if the dross adhered to the vicinity of an opening of the penetrated portion falls off and is mixed into the liquid, the dross is ejected out of the nozzle orifice together with the liquid. Accordingly, occurrence of occlusion of the nozzle is avoided.

A tenth aspect of the present invention is the method of fabricating a liquid-jet head according to any one of the eighth and the ninth aspects, in which a laser beam with a fundamental wavelength oscillated by a Q-switched YAG laser oscillator is irradiated on the vibration plate in the step of forming a penetrated portion.

According to the tenth aspect, the penetrated portion is formed by locally heating the vibration plate. Therefore, it is possible to form the penetrated portion favorably without affecting the periphery thereof. In particular, since the penetrated portion can be formed by a laser beam with a relatively low output level, the passage-forming substrate in the vicinity thereof is prevented from deformation attributable to processing or heat.

An eleventh aspect of the present invention is the method of fabricating a liquid-jet head according to any one of the eighth and the ninth aspects, in which a laser beam with a higher harmonic wavelength oscillated by a Q-switched YAG laser oscillator is irradiated on the vibration plate in the step of forming a penetrated portion.

According to the eleventh aspect, the penetrated portion is formed by locally heating the vibration plate. Therefore, it is possible to form the penetrated portion favorably without affecting the periphery thereof.

A twelfth aspect of the present invention is the method of fabricating a liquid-jet head according to any one of the eighth and the ninth aspects, in which a laser beam with a second harmonic wavelength oscillated by a Q-switched YAG laser oscillator is irradiated on the vibration plate in the step of forming a penetrated portion.

According to the twelfth aspect, the penetrated portion is formed by locally heating the vibration plate. Therefore, it is possible to form the penetrated portion favorably without affecting the periphery thereof.

A thirteenth aspect of the present invention is the method of fabricating a liquid-jet head according to any one of the eighth to the twelfth aspects, in which the laser processing is performed underwater.

According to the thirteenth aspect, fragments generated upon formation of the penetrated portion are rinsed off with water. Therefore, it is possible to prevent the fragments from remaining and being mixed into the liquid.

A fourteenth aspect of the present invention is the method of fabricating a liquid-jet head according to any one of the eighth to the thirteenth aspects, in which the laser beam is irradiated on the vibration plate in a region corresponding to an open edge of the communicating portion and the laser beam is scanned along the open edge of the communicating portion in the step of forming a penetrated path.

According to the fourteenth aspect, the penetrated portion is formed by locally heating the vibration plate. Therefore, it is possible to form the penetrated portion favorably without affecting the periphery thereof.

A fifteenth aspect of the present invention is the method of a liquid-jet head according to any one of the eighth to the thirteenth aspects, in which a plurality of penetrated holes are formed on at least the vibration plate in a region opposite to the communicating path in the step of forming a penetrated portion.

According to the fifteenth aspect, it is possible to form the penetrated portion favorably without affecting the periphery thereof.

A sixteenth aspect of the present invention is the method of fabricating a liquid-jet head according to any one of the eighth to the fifteenth aspects. Here, before the step of forming the penetrated portion on the vibration plate the method includes the step of bonding a reservoir-forming plate, which has a reservoir portion communicating with the communicating path via the pierced hole, to the passage-forming substrate on a side where the piezoelectric element is formed.

According to the sixteenth aspect, rigidity of the passage-forming substrate is increased owing to the reservoir-forming plate. Therefore, it is possible to form the pressure-generating chamber and the communicating path favorably by etching and to form the penetrated portion favorably.

DETAILED DESCRIPTION OF THE PREFERRED EMBODIMENTS

Hereinafter, the present invention will be described in detail based on certain preferred embodiments.

(Embodiment 1)

Figure 1:
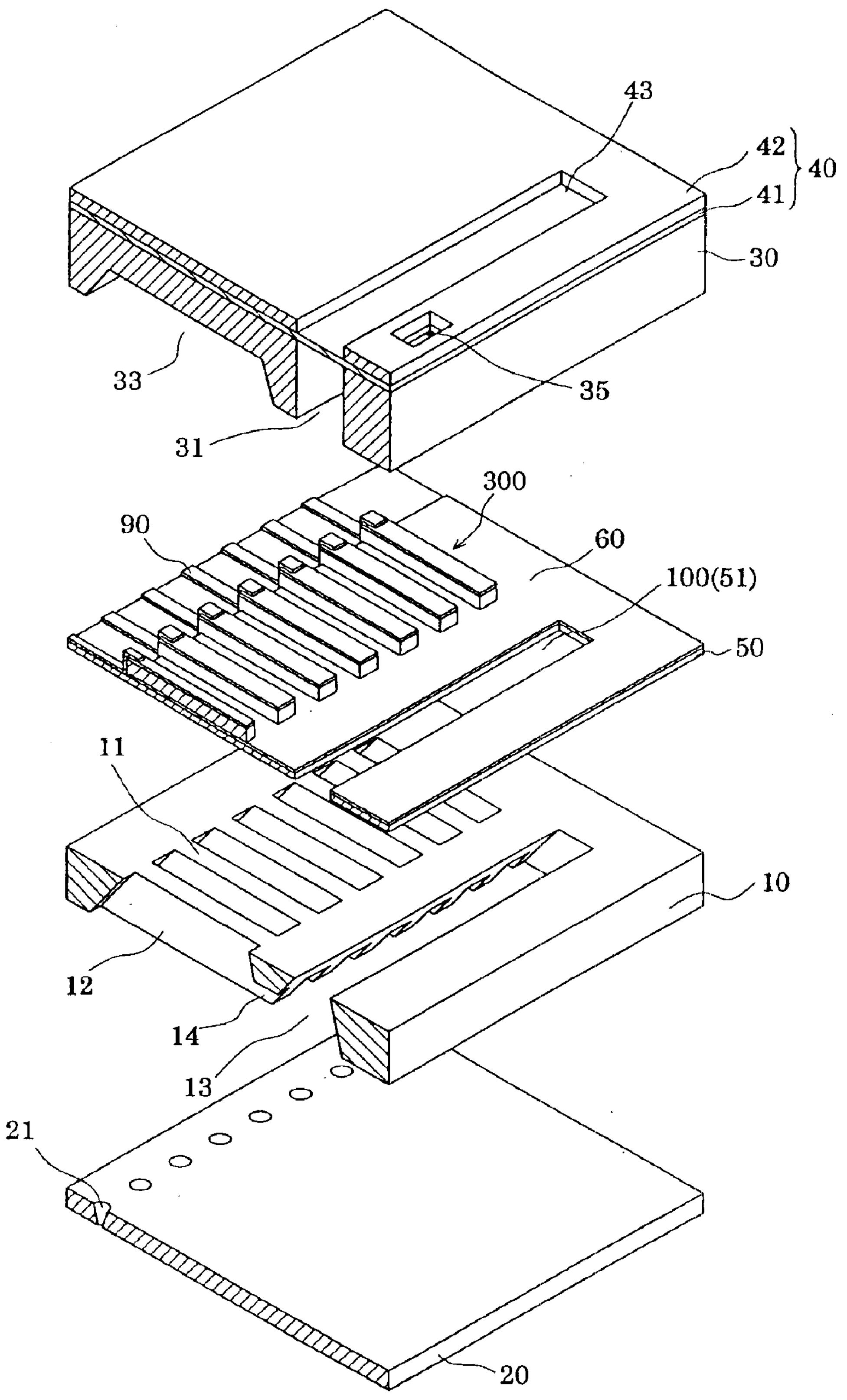
FIG. 1 is an exploded perspective view showing an ink-jet recording head according to embodiment 1 of the present invention.
Figure 2A:
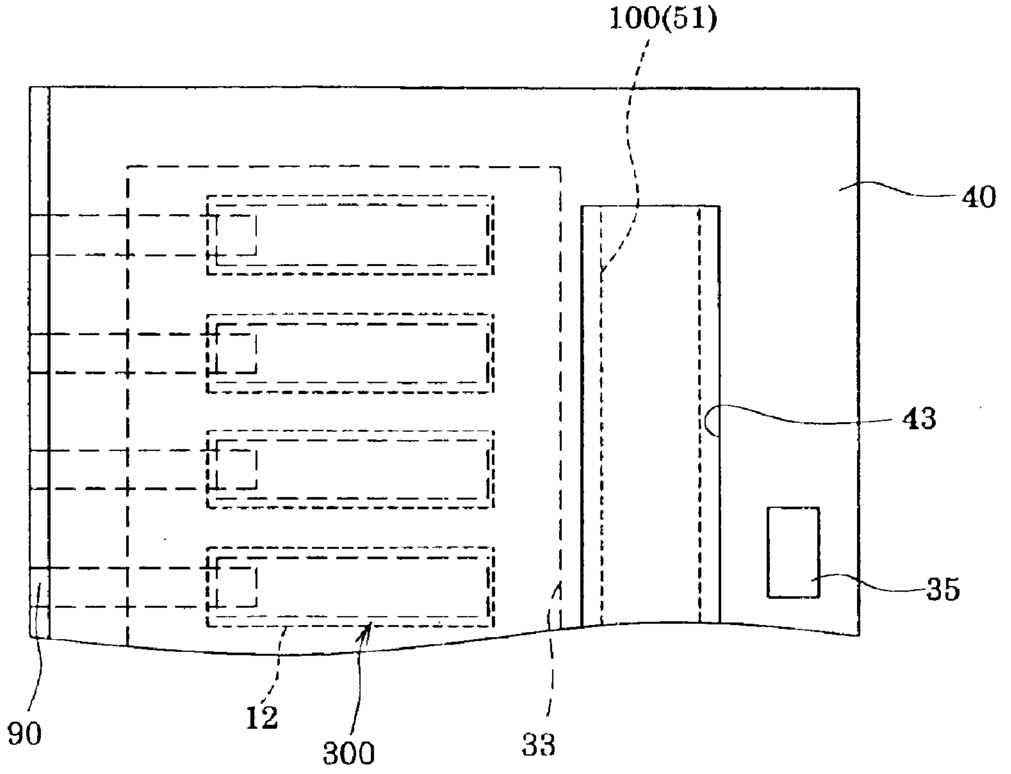
FIG. 2A is a plan view showing the ink-jet recording head according to embodiment 1 of the present invention.
Figure 2B:
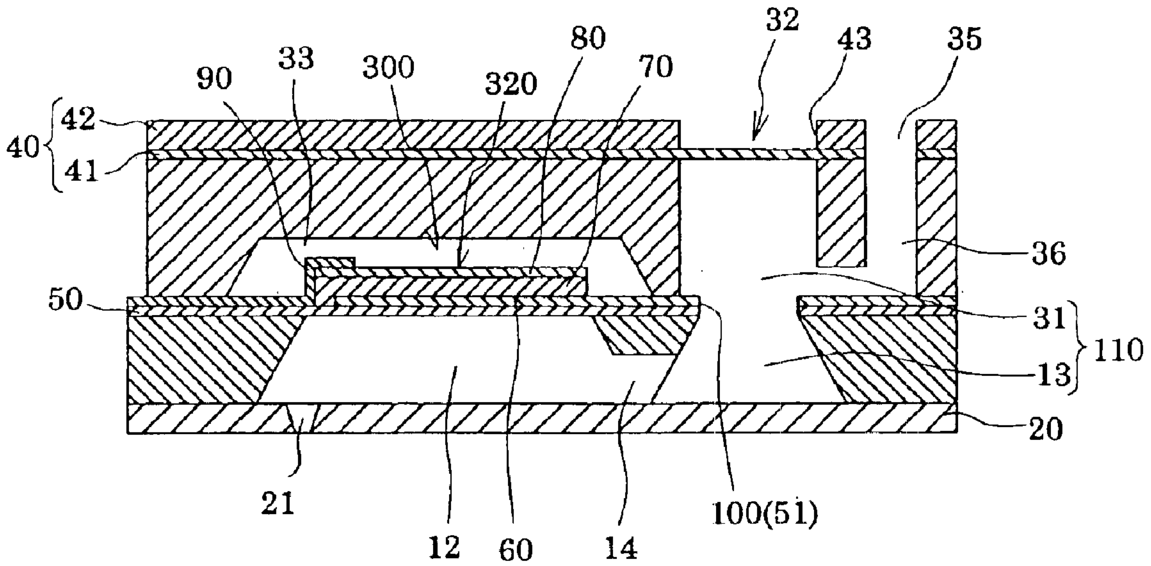
FIG. 2B is a cross-sectional view showing the ink-jet recording head according to embodiment 1 of the present invention.

FIG. 1 is an exploded perspective view showing an ink-jet recording head according to embodiment 1 of the present invention. FIGS. 2A and 2B are a plan view and a cross-sectional view relevant to FIG. 1, respectively.

As shown in the drawings, a passage-forming substrate 10 is made of a single-crystal silicon substrate having plane orientation of (110) in this embodiment. On this passage-forming substrate 10, pressure-generating chambers 12 partitioned by a plurality of partition walls 11 are arranged in parallel along the width direction thereof. The pressure-generating chambers 12 are formed by anisotropic etching from one plane of the passage-forming substrate 10. Moreover, outside one end in a longitudinal direction of each pressure-generating chamber 12, a communicating path 13 is formed, which constitutes part of a reservoir 110 as a common ink chamber to the respective pressure-generating chambers 12 by communicating with a reservoir portion of a reservoir-forming plate to be described later. The communicating path 13 communicates with one end in the longitudinal direction of respective pressure-generating chambers 12 via each ink supply path 14.

Meanwhile, on the other plane of the passage-forming substrate 10, an elastic film 50 in a thickness from 1 to 2 μm is formed, which is made of silicon oxide. ($SiO_2$), for example.

Here, the anisotropic etching is performed by use of a difference in etching rates on the single-crystal silicon substrate. For example, if the single-crystal silicon substrate is soaked into an alkaline solution such as KOH in this embodiment, then the single-crystal silicon substrate is gradually corroded away, whereby a first (111) plane perpendicular to a (110) plane, and a second (111) plane at about a 70-degree angle with the first (111) plane and about a 35-degree angle with the (110) plane emerge. The anisotropic etching is performed by use of the disposition that the etching rate of the (111) plane is about 1/180 of the etching rate of the (110) plane. By use of the anisotropic etching as described above, it is possible to perform high-precision processing based on depth processing in a parallelogram shape defined by two of the first (111) planes and two of the inclined second (111) planes. In this way, it is possible to arrange the pressure-generating chambers 12 in high density.

In this embodiment, long edges of the respective pressure-generating chambers 12 are formed by the first (111) planes and short edges thereof are formed by the second (111) planes. Moreover, the pressure-generating chambers 12 and the communicating path 13 are formed by etching so as to almost penetrate the passage-forming substrate 10 until reaching the elastic film 50. Here, the elastic film 50 is exposed to an extremely small degree of erode by the alkaline solution for etching the single-crystal silicon substrate.

Moreover, each ink supply path 14 communicating with one end of each pressure-generating chamber 12 is formed shallower than the pressure-generating chamber 12, whereby resistance on a passage of the ink flowing into the pressure-generating chamber 12 is maintained at a constant level. In other words, the ink supply paths 14 are formed by etching the single-crystal silicon substrate halfway in the thickness direction (half-etching). Note that the half-etching is performed by adjusting etching time.

Regarding the thickness of the passage-forming substrate 10, an optimum thickness is selected in accordance with arranging density of the pressure-generating chambers 12. In the case of arranging the pressure-generating chambers 12 by 180 pieces per inch (180 dpi) or thereabout, for example, the thickness of the passage-forming substrate 10 is preferably set in a range from about 180 to 280 μm, or more preferably at about 220 μm. In the case of arranging the pressure-generating chambers 12 in relatively high density by 360 dpi or thereabout, for example, then the thickness of the passage-forming substrate 10 is preferably set within 100 μm. This is because the partition walls between adjacent pressure-generating chambers can maintain sufficient rigidity while increasing the arranging density.

A nozzle plate 20 is fixed to an open side of the passage-forming substrate 10 with an adhesive, a thermo-bonding film, or the like. Here, the nozzle plate 20 is provided with nozzle orifices 21 drilled thereon. The nozzle orifices 21 communicate with the respective pressure-generating chambers 12 on opposite sides to the ink supply paths 14. The nozzle plate 20 is made of glass ceramics, stainless steel or the like, which has a thickness in a range from 0.1 to 1 mm and a coefficient of linear expansion in a range from 2.5 to $4.5\times10^{-6}/°$ C. at a temperature of 300° C. or lower, for example. The nozzle plate 20 covers the entire surface of one plane of the passage-forming substrate 10 with one plane thereof, whereby the nozzle plate 20 also functions as a reinforcing plate for protecting the single-crystal silicon substrate against shock or external force. Meanwhile, it is also possible to form the nozzle plate 20 by use of a material having a coefficient of thermal expansion almost as the same as that of the passage-forming substrate 10. In this case, degrees of deformation of the passage-forming substrate 10 and the nozzle plate 20 owing to heat become almost equivalent to each other. Accordingly, it is possible to bond the both members easily by use of a thermosetting adhesive or the like.

Here, sizes of the nozzle orifices 21 and sizes of the pressure-generating chambers 12 are optimized in accordance with an amount of ink droplets to be ejected, a eject speed, a eject frequency and the like. For example, in the case of recording 360 dots of ink droplets per inch, the nozzle orifices 21 need to be formed accurately so as to have diameters of several ten micrometers.

Meanwhile, a lower electrode film 60 having a thickness of about 0.2 $\mu$m, for example, a piezoelectric layer 70 having a thickness in a range from about 0.5 to 3 $\mu$m, for example, and an upper electrode film 80 having a thickness of about 0.1 $\mu$m, for example, are formed on the elastic film 50 provided on the passage-forming substrate 10 by lamination in accordance with a process to be described later, whereby piezoelectric elements 300 are constituted accordingly. Here, the piezoelectric elements 300 refer to portions including the lower electrode film 60, the piezoelectric layer 70 and the upper electrode film 80. In general, each of the piezoelectric elements 300 is constituted by setting one of the electrodes thereof as a common electrode, while patterning the other electrode and the piezoelectric layer 70 depending on each pressure-generating chamber 12. Moreover, each portion composed of one of the electrodes and the piezoelectric layer 70 which are patterned, in which piezoelectric distortion is caused upon application of electric voltage between the both electrodes, is hereinafter referred to as a piezoelectric active portion 320. In this embodiment, the lower electrode film 60 is defined as the common electrode of each piezoelectric element 300 and the upper electrode film 80 is defined as an individual electrode of the piezoelectric element 300. However, it is by all means possible to invert such definitions due to reasons attributable to drive circuits or wiring designs. In any case, each piezoelectric active portion will be formed on each pressure-generating chamber. Furthermore, the piezoelectric element 300 and a vibration plate, which is displaced when the piezoelectric element 300 is driven, are hereinafter collectively referred to as a piezoelectric actuator.

Moreover, the reservoir-forming plate 30 including the reservoir portion 31 which constitutes at least part of the reservoir 110 is bonded onto the passage-forming substrate 10 where the piezoelectric elements are formed. In this embodiment, the reservoir portion 31 penetrates the reservoir-forming plate 30 in the thickness direction thereof and is formed across the pressure-generating chambers 12 in the width direction thereof. In addition, the reservoir portion 31 is formed such that at least an open region of the reservoir portion 31 on the passage-forming substrate 10 side is larger than an open region of the communicating path 13 on the reservoir-forming plate 30 side. Furthermore, the reservoir portion 31 communicates with the communicating path 13 of the passage-forming substrate 10 via a penetrated portion 100 which penetrates the elastic film 50 and the lower electrode film 60, thus constituting the reservoir 110 as a common ink chamber to the respective pressure-generating chambers 12.

As for the reservoir-forming plate 30, it is preferred to use a material having almost the same coefficient of thermal expansion as that of the passage-forming substrate 10 such as glass and a ceramic material. In this embodiment, for example, the reservoir-forming plate 30 is made of a single-crystal silicon substrate having a thickness of about 400 $\mu$m, which is the same material as the passage-forming substrate 10.

Here, the penetrated portion 100 which connects between the communicating path 13 and the reservoir portion 31 is formed in a region of the elastic film 50 and the lower electrode film 60 opposite to the communicating path 13; more specifically, inside the open region of the communicating path 13 on the reservoir-forming plate 30 side. For example, the penetrated portion 100 of this embodiment is composed of a pierced hole 51, which is almost as large as the open region of the communicating path 13 on the reservoir-forming plate 30 side.

As will be described later in detail, the penetrated portion 100 is formed by laser processing of the vibration plate (the elastic film 50 and the lower electrode film 60). In this way, the penetrated portion 100 is favorably formed without generating cracks or the like in the periphery thereof. As a result, fragments of the elastic film 50 or the lower electrode film 60 are not scattered and mixed into the ink. In this way, it is possible to prevent occurrence of imperfect ink eject attributable to occlusion of the nozzle orifice 21 by the fragments.

A compliance substrate 40 composed of a sealing film 41 and a fixing plate 42 is bonded to the reservoir-forming plate 30. Here, the sealing film 41 is made of a material having low rigidity and high flexibility (such as a polyphenylene sulfide (PPS) film having a thickness of 6 $\mu$m). One side of the reservoir portion 31 is sealed by this sealing film 41. Meanwhile, the fixing plate 42 is made of a hard material of metal or the like (such as stainless steel (SUS) having a thickness of 30 $\mu$m). Moreover, a region of the fixing plate 42 opposite to the reservoir 110 is completely removed in the thickness direction so as to constitute an opening portion 43. Accordingly, one side of the reservoir 110 is just sealed by the flexible sealing film 41 and thereby constitutes a flexible portion 32, which is deformable upon variations of inner pressure.

Moreover, an ink introducing port 35 for supplying the ink to the reservoir 110 is formed on the compliance substrate 40 in a position outside almost the central portion in the longitudinal direction of the reservoir 110. In addition, an ink introducing path 36 is provided in the reservoir-forming plate 30 so as to connect between the ink introducing port 35 and a sidewall of the reservoir 110.

Meanwhile, in a region of the reservoir-forming plate 30 opposite to the piezoelectric elements 300, a piezoelectric element holding portion 33 is provided so as to secure a sufficient space not to interfere with motion of the piezoelectric elements 300 and so as to hermetically seal the space. Here, at least the piezoelectric active portions 320 of the piezoelectric elements 300 are hermetically sealed inside the piezoelectric element holding portion 33, whereby the piezoelectric elements 300 are prevented from destruction attributable to external environment such as moisture in the atmosphere.

The ink-jet recording head constituted as described above intakes the ink through the ink introducing port 35 connected to unillustrated external ink supply means, whereby the ink is filled throughout the inside from the reservoir 110 to the nozzle orifices 21. Next, electric voltage is applied between the upper electrode film 80 and the lower electrode film 60 in accordance with a recording signal from an unillustrated external drive circuit, whereby the elastic film 50, the lower electrode film 60 and the piezoelectric layer 70 are subjected to flexure deformation. In this way, pressure inside the pressure-generating chamber 12 is increased and the ink droplets are thereby ejected out of the relevant nozzle orifice 21.

Now, description will be made regarding a method of fabricating the above-described ink-jet recording head with reference to FIG. 3A to FIG. 4D. Note that FIG. 3A to FIG. 4D are cross-sectional views taken along the longitudinal direction of the pressure-generating chamber 12.

Figure 3A:
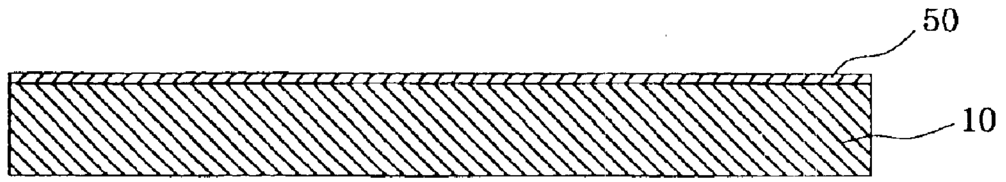
FIGS. 3A to 3D are cross-sectional views showing a fabrication process of the ink-jet recording head according to embodiment 1 of the present invention.

First, as shown in FIG. 3A, the elastic film 50 is formed. To be more precise, a zirconium layer is formed on the passage-forming substrate 10 and then subjected to thermal oxidation in a diffusion furnace at a temperature in a range from 500° C. to 1200° C., thus forming the elastic film 50 made of zirconium oxide.

Figure 3B:
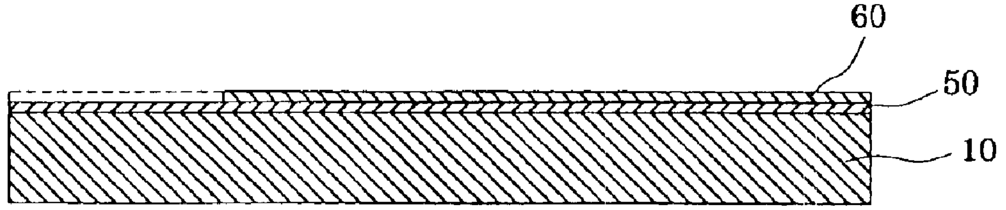

Next, as shown in FIG. 3B, the lower electrode film 60 made of platinum, for example, is formed on the entire surface of the elastic film 50 and then patterned into a given shape.

Figure 3C:
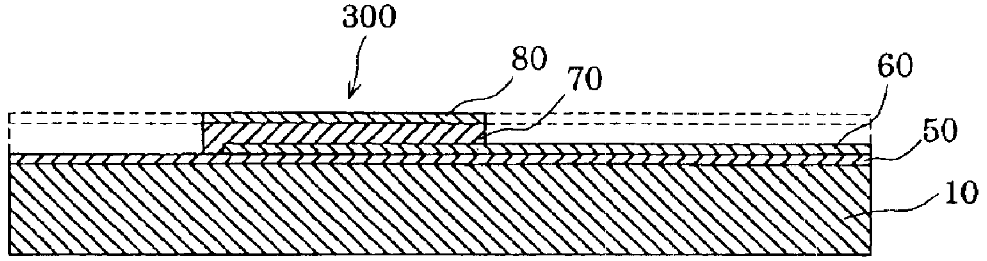

Next, as shown in FIG. 3C, the piezoelectric layer 70 made of lead zirconate titanate (PZT), for example, and the upper electrode film 80 made of a variety of metal including aluminum, gold, nickel, platinum and the like, or made of a conductive oxide and the like, are deposited serially and then patterned simultaneously to form the piezoelectric elements 300.

Figure 3D:
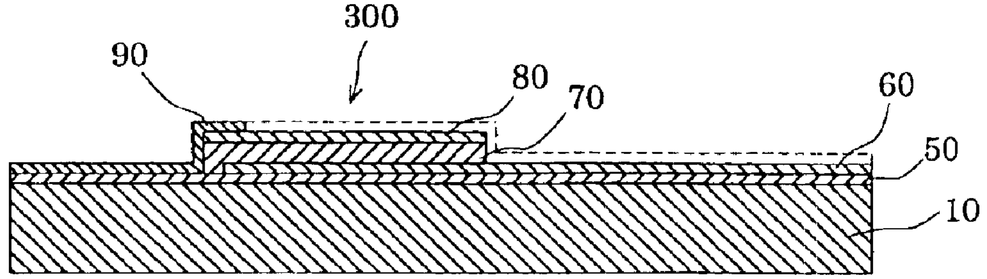

Subsequently, as shown in FIG. 3D, a lead electrode 90 made of gold (Au), for example, is formed on the entire surface of the passage-forming substrate 10 and then patterned in line with the respective piezoelectric elements 300.

Figure 4A:
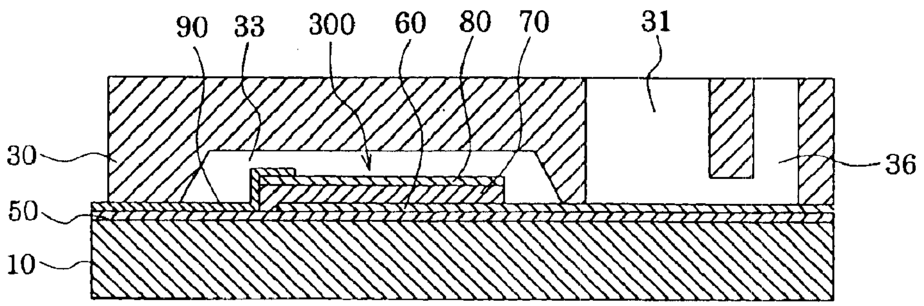
FIGS. 4A to 4D are cross-sectional views showing the fabrication process of the ink-jet recording head according to embodiment 1 of the present invention.

The foregoing steps collectively constitute a film-forming process. Now, as shown in FIG. 4A, the reservoir-forming plate 30 where the reservoir portion 31, the piezoelectric element holding portion 33 and the like are formed is bonded to the passage-forming substrate 10 on the side where the piezoelectric elements 300 are formed, by use of an adhesive or the like.

Figure 4B:
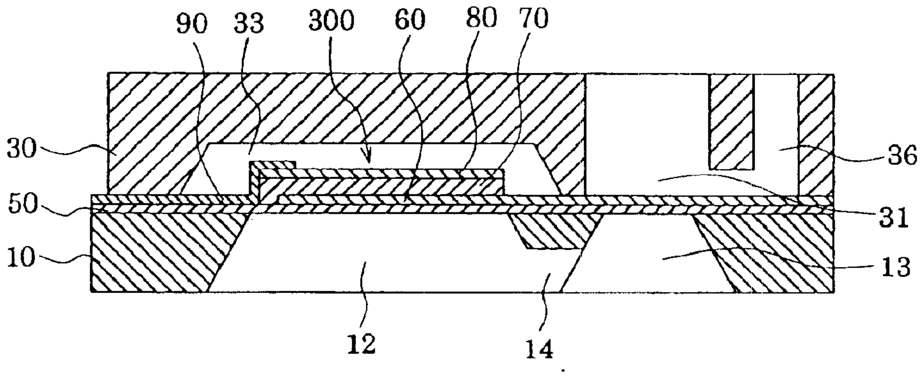
Figure 4C:
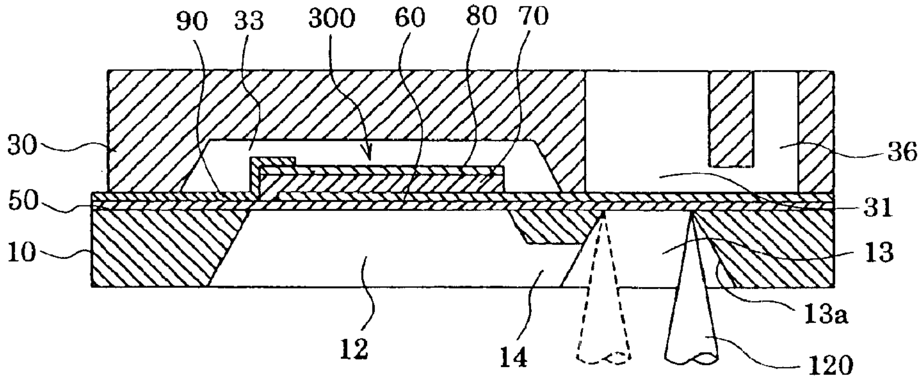

Subsequently, as previously described, the passage-forming substrate 10 made of the single-crystal silicon substrate is subjected to the anisotropic etching until reaching the elastic film 50, whereby the pressure-generating chambers 12, the communicating path 13 and the ink supply paths 14 are simultaneously formed as shown in FIG. 4B. Next, as shown in FIG. 4C, the elastic film 50 and the lower electrode film 60 in the region opposite to the communicating path 13 are removed by laser-processing, whereby the penetrated portion 100 is formed.

Figure 4D:
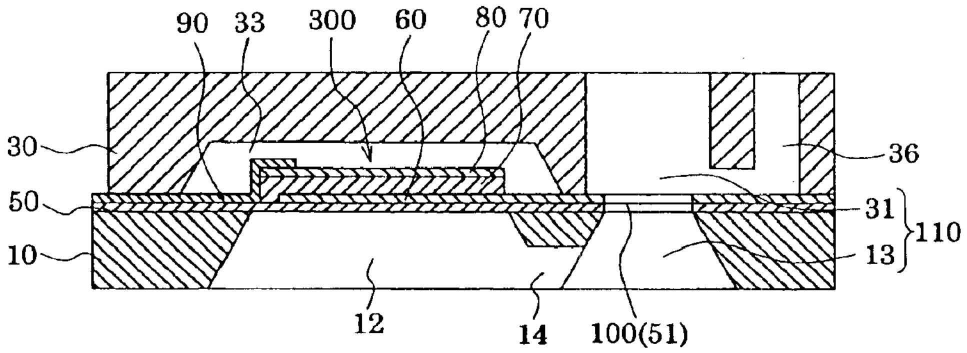

To be more precise, a laser beam 120 is focused and irradiated from the communicating path 13 side of the passage-forming substrate 10 onto the elastic film 50 in the region corresponding to the open edge of the communicating path 13 on the reservoir side, and then the laser beam 120 is scanned along the open edge of the communicating path 13. In this way, the elastic film 50 and the lower electrode film 60 are locally subjected to thermal processing and thereby cut away along the open edge of the communicating path 13. As a consequence, the elastic film 50 and the lower electrode film 60 in the open region of the communicating path 13 are removed together as shown in FIG. 4D and the penetrated portion 100 is formed. In short, the penetrated portion 100 is formed virtually as the same size as the open region of the communicating path 13 on the vibration plate side.

Here, it is preferred to use a laser beam oscillated by a Q-switched YAG laser oscillator for formation of the penetrated portion 100, i.e. removal of the elastic film 50 and the lower electrode film 60. For example, in this embodiment, a laser beam having a fundamental wavelength (1064 nm) is focused and irradiated on the surface of the elastic film 50, and the penetrated portion 100 is formed by cutting the elastic film 50 and the lower electrode film 60 away.

For example, in this embodiment, the laser beam having the fundamental wavelength is oscillated at an output level of about 10 mW (a repetition frequency at 1 kHz) by the Q-switched YAG laser oscillator and is irradiated from the elastic film 50 side onto the vibration plate so as to form the penetrated portion 100.

In this way, it is possible to prevent the fragments of the elastic film 50 or the lower electrode film 60 from scattering in the event of forming the penetrated portion 100, and it is also possible to avoid occurrence of imperfect eject such as occlusion of the nozzle by the fragments.

Moreover, since the Q-switched YAG laser oscillator is used for forming the penetrated portion 100, it is possible to process with a laser beam at a relatively lower power level. Specifically, since the penetrated portion 100 is formed in this embodiment by use of the laser beam having the fundamental wavelength, the passage-forming substrate 10 and the like in the vicinity of the penetrated portion 100 are prevented from being processed (heated) by the laser beam. Accordingly, it is possible to cut only the elastic film 50 and the lower electrode film 60 favorably.

Figure 5:
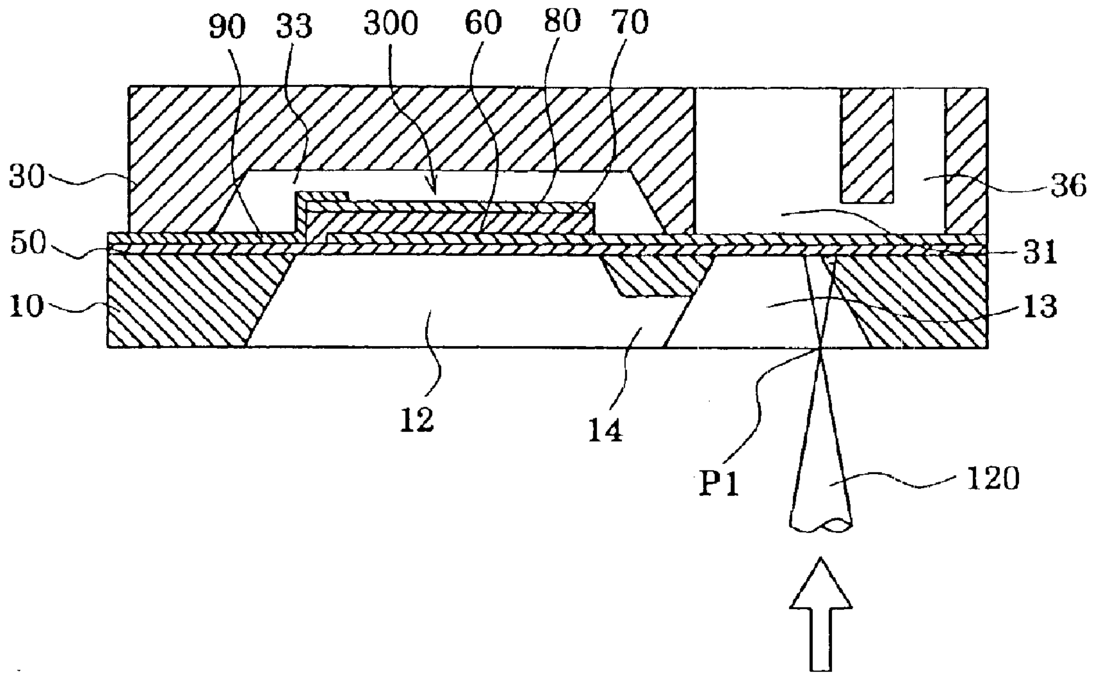
FIG. 5 is a cross-sectional view showing the fabrication process of the ink-jet recording head according to embodiment 1 of the present invention.
Figure 6:
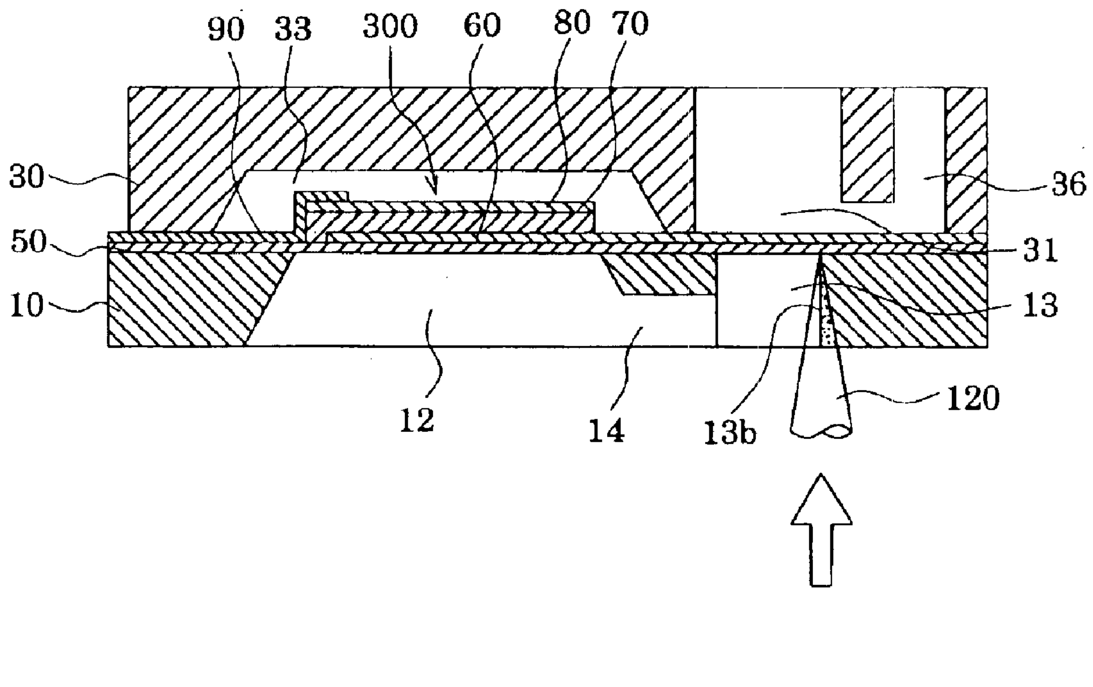
FIG. 6 is a cross-sectional view showing the fabrication process of the ink-jet recording head according to embodiment 1 of the present invention.

Here, if a focus point P1 of the laser beam 120 is located in a position shifted from the vibration plate as shown in FIG. 5, for example, then the laser beam 120 will be also irradiated on the passage-forming substrate 10 as well as the elastic film 50. Moreover, the communicating path 13, for example, is formed by subjecting the passage-forming substrate 10 to the anisotropic etching. Therefore, the side face of the communicating path 13 includes portions composed of inclined planes 13*a* as shown in FIG. 4C, which are inclined with respect to the surface of the passage-forming substrate 10. Moreover, the side face of the communicating path 13 also includes portions composed of perpendicular planes 13*b*, which are almost orthogonal with respect to the surface of the passage-forming substrate 10. Accordingly, although the laser beam 120 may not be irradiated on the passage-forming substrate 10 in the portion where the side face of the communicating path 13 is composed of the inclined plane 13*a*, the laser beam 120 is surely irradiated on the passage-forming substrate 10 in the portion where the side face of the communicating path 13 is composed of the perpendicular plane 13*b* (see FIG. 6).

Nevertheless, in this embodiment, the passage-forming substrate 10 is made of the single-crystal silicon substrate having a relatively low index of laser-beam absorption, and the elastic film 50 and the lower electrode film 60 are cut away by irradiating the laser beam of the fundamental wavelength at a relatively low output level. Accordingly, if the laser beam 120 is irradiated on the passage-forming substrate 10, it is possible to cut only the elastic film 50 and the lower electrode film 60 away favorably without processing (heating) the passage-forming substrate 10.

Meanwhile, in the event of forming the penetrated portion 100 by laser processing as described above, dross is adhered to a surface of the vibration plate opposite to the side where the laser beam 120 is irradiated, i.e. to a surface of the lower electrode film 60 in the periphery of the penetrated portion 100. If the dross falls off and is mixed into the ink, there is a risk of causing imperfect eject such as occlusion of the nozzle by the dross.

Nevertheless, if the penetrated portion 100 is formed by cutting the elastic film 50 and the lower electrode film 60 away along the open edge of the communicating path 13 as described in this embodiment, in other words, if the elastic film 50 and the lower electrode film 60 are cut away and removed by means of locally irradiating the laser beam 120 only onto the region corresponding to the open edge of the communicating path 13, the size of the dross to be adhered to the periphery of the penetrated portion 100 is limited to one-fourth or less of a diameter of the nozzle orifice 21.

Therefore, if the dross of that size falls off and is mixed into the ink, this dross will be ejected from the nozzle orifice 21 together with the ink. Accordingly, occlusion of the nozzle by the dross does not occur, and ink eject performance can be thereby maintained favorably.

Note that the penetrated portion 100 is formed by irradiating the laser beam having the fundamental wavelength onto the elastic film 50 and the lower electrode film 60 in this embodiment. However, the penetrated portion 100 may be also formed by irradiating a laser beam having a higher harmonic wavelength oscillated from the Q-switched YAG laser oscillator, for example, by irradiating a second harmonic laser beam (having a wavelength of 532 nm). If the penetrated portion 100 is formed by such a laser beam having a relatively shorter wavelength, the size of the dross will be reduced even smaller. Therefore, it is possible to prevent occurrence of occlusion of the nozzle or the like even more surely.

Figure 7:
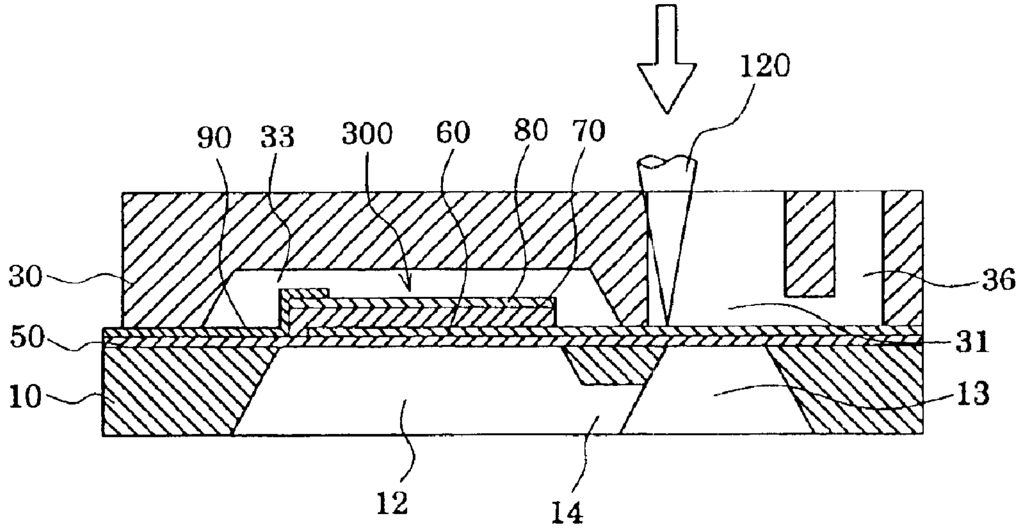
FIG. 7 is a cross-sectional view showing another example of the fabrication process of the ink-jet recording head according to embodiment 1 of the present invention.

Moreover, in this embodiment, the penetrated portion 100 is formed by irradiating the laser beam from the elastic film 50 side onto the vibration plate because the reservoir-forming plate 30 has a thickness several times thicker than the passage-forming substrate 10. However, the direction of irradiation of the laser beam is not particularly limited thereto. It is by all means possible to form the penetrated portion 100 by irradiating the laser beam from the lower electrode film 60 side onto the vibration plate as shown in FIG. 7. As previously mentioned, the lower electrode film 60 tends to absorb the laser beam relatively easily because the lower electrode film 60 is made of metal such as platinum. Therefore, the mode of irradiating the laser beam from the lower electrode film 60 side onto the vibration plate offers an advantage of enhancement in process efficiency.

Furthermore, although the laser processing may take place in the atmosphere, it is preferred to dispose the workpiece fabricated in the foregoing steps underwater. In other words, it is preferred to form the penetrated portion 100 by means of irradiating the laser beam onto the elastic film 50 and the lower electrode film 60 underwater. In this way, it is possible to surely prevent the fragments of the elastic film 50 or the lower electrode film 60 from being mixed into the ink.

As described above, the present invention adopts the mode of forming the penetrate portion 100 by use of the laser processing. Accordingly, cracks and the like are not generated on the elastic film 50 and the lower electrode film 60 around the penetrated portion 100. Therefore, when the ink is filled into the reservoir 110, the elastic film 50 and the lower electrode film 60 around the penetrated portion 100 do not fall off largely owing to the cracks. Accordingly, such a large fragment will not be mixed into the ink. As a consequence, it is possible to prevent imperfect eject such as occlusion of the nozzle, and to achieve the ink-jet recording head with improved reliability.

Moreover, since the penetrated portion 100 is formed by the laser processing, i.e. non-contact processing, it is possible to form the penetrated portion 100 easily and favorably regardless of in an underwater condition or an atmospheric condition, without requiring special treatment.

After the penetrated portion 100 is formed as described above, the compliance substrate 40 is bonded onto the reservoir-forming plate 30 and the nozzle plate 20 is bonded to and integrated with the passage-forming substrate 10 on the opposite side to the reservoir-forming plate 30. In this way, the ink-jet recording head is fabricated.

(Embodiment 2)

Figure 8:
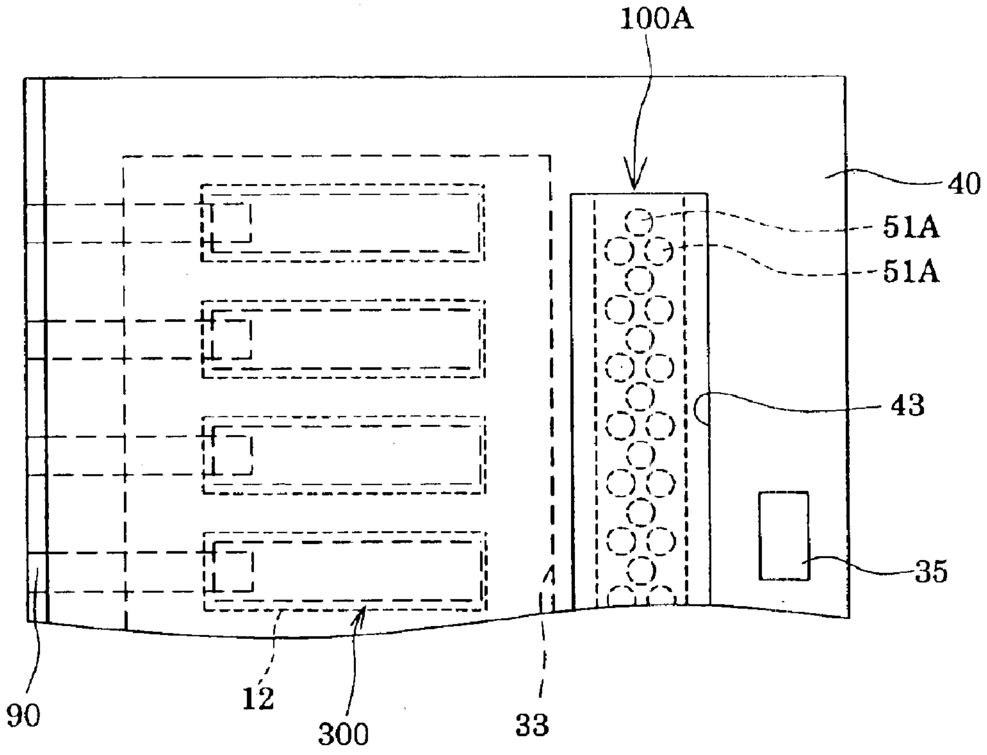
FIG. 8 is a plan view showing principal parts of an ink-jet recording head according to embodiment 2 of the present invention.

FIG. 8 is a plan view of an ink-jet recording head according to embodiment 2.

Embodiment 1 describes the example that the penetrated portion 100 is composed of the pierced hole 51 almost as large as the open region of the communicating path 13 on the reservoir-forming plate 30 side. However, it is just satisfactory as far as the penetrated portion 100 is formed inside the open region of the communicating path 13.

This embodiment shows an example that a penetrated portion is composed of penetrated holes smaller in size than an open region of a communicating path. To be more precise, as shown in FIG. 8, a penetrated portion 100A is composed of a plurality of penetrated holes 51A formed on a vibration plate in a region corresponding to an open region of a communicating path 13. Here, other elements are similar to those in embodiment 1.

As similar to embodiment 1, the plurality of penetrated holes 51A can be formed by cutting an elastic film 50 and a lower electrode film 60 by scanning with a laser beam 120 so as to remove the elastic film 50 and the lower electrode film 60 together regarding portions to form the respective penetrated holes 51A.

If the sizes of the penetrated holes 51A are relatively small, then it is also possible to irradiate the laser beam onto the elastic film 50 and the lower electrode film 60 in the positions to form the respective penetrated holes 51A such that the relevant portions of the elastic film 50 and the lower electrode film 60 are removed by thermal processing.

Similar effects to embodiment 1 can be obtained if the penetrated portion 100A is composed of the plurality of penetrated holes 51A as described above.

(Other embodiments)

Although the present invention has been described with reference to certain embodiments, it is to be noted that the present invention is not limited to the above-described embodiments.

For example, although the penetrated portion 100 is formed after bonding the reservoir-forming plate 30 to the passage-forming substrate 10 in the above-described embodiments, it is by all means possible to form the penetrated portion 100 before bonding the reservoir-forming plate 30 to the passage-forming substrate 10.

Figure 9A:
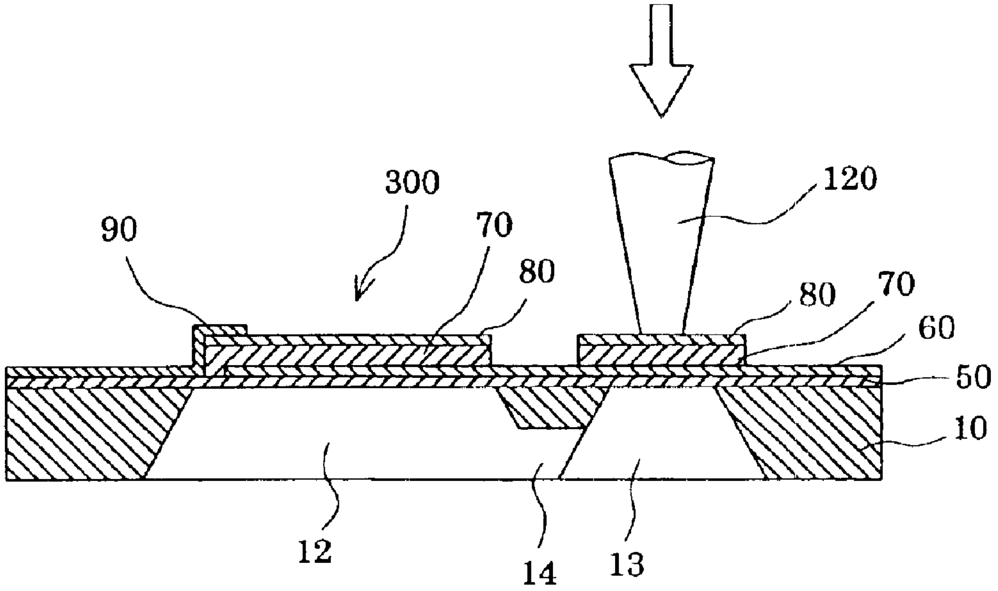
FIGS. 9A and 9B are cross-sectional views showing another fabrication process of an ink-jet recording head according to another embodiment of the present invention.
Figure 9B:
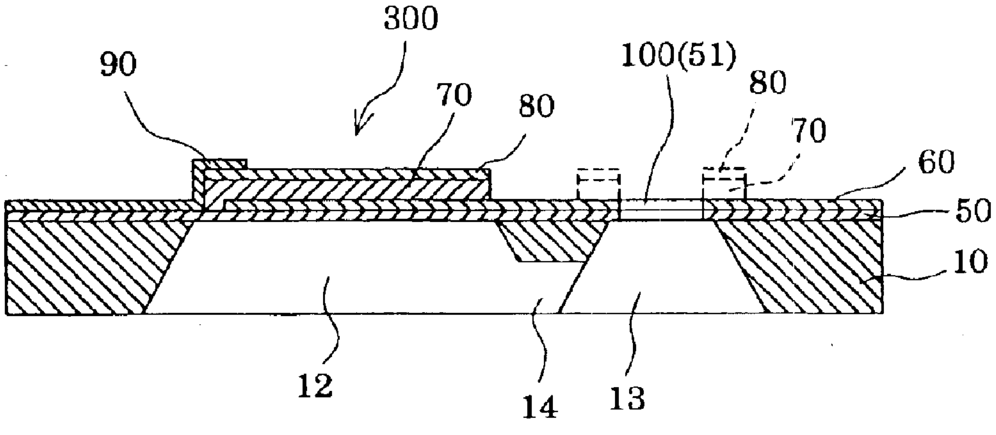

Moreover, in the above-described embodiment 1, the penetrated portion 100 is formed by scanning along the open edge of the communicating path 13 with the laser beam to cut the elastic film 50 and the lower electrode film 60 away. However, without limitation to the foregoing, it is by all means possible to irradiate the laser beam onto the elastic film 50 and the lower electrode film 60 within the open region of the communicating path 13 so as to remove the elastic film 50 and the lower electrode film 60 away by thermal processing. When the elastic film 50 and the lower electrode film 60 are removed by thermal processing as described above, for example, it is also possible to leave the piezoelectric layer 70 and the upper electrode film 80 for constituting the piezoelectric element 300 on the lower electrode film 60 in the region opposite to the communicating path 13 as shown in FIG. 9A, and to form the penetrated portion 100 by irradiating the laser beam 120 from above the upper electrode film 80. Rigidity of the films formed in the region opposite to the communicating path 13 is enhanced by means of leaving the piezoelectric layer 70 and the upper electrode film 80 in the region opposite to the communicating path 13. Accordingly, it is possible to favorably form the penetrated portion 100. Note that the piezoelectric layer 70 and the upper electrode film 80 in the region opposite to the communicating path 13 may still remain after formation of the penetrated portion 100. However, in reality, the piezoelectric layer 70 and the upper electrode film 80 are substantially removed by irradiation of the laser beam 120 as shown in FIG. 9B.

Moreover, in the above-described embodiments, the Q-switched YAG laser oscillator is used for forming the penetrated portion 100, for example. However, without limitation to the foregoing, it is also possible to use a femtosecond laser oscillator, for example, which can oscillate laser beams smaller in pulse widths than the Q-switched YAG laser oscillator.

Moreover, in the above-described embodiments, the communicating path 13 is formed continuously over the regions corresponding to the plurality of the pressure-generating chambers 12 to communicate with the plurality of the pressure-generating chambers 12 via the respective ink supply paths 14, for example. However, without limitation to the foregoing, it is also possible to form the communicating paths 13 independently for the respective pressure-generating chambers 12, for example. In this case, it is preferred to provide the penetrated portions 100 independently for the respective communicating paths 13 as well.

Furthermore, the above-described embodiments have exemplified the ink-jet recording head of a thin-film type, which can be fabricated by applying film-forming and lithography processes. However, it is needless to say that the present invention is not limited to the foregoing. For example, the present invention is also applicable to ink-jet recording heads having various types of structures, such as an ink-jet recording head including pressure-generating chambers formed by laminating substrates, an ink-jet recording head including a piezoelectric layer formed by adhesion of a green sheet or by screen printing, and an ink-jet recording head including a piezoelectric layer formed by crystal growth owing to hydrothermal crystallization method or the like.

As described above, the present invention is applicable to various ink-jet recording heads having different structures unless such application goes against the spirit of the invention.

Figure 10:
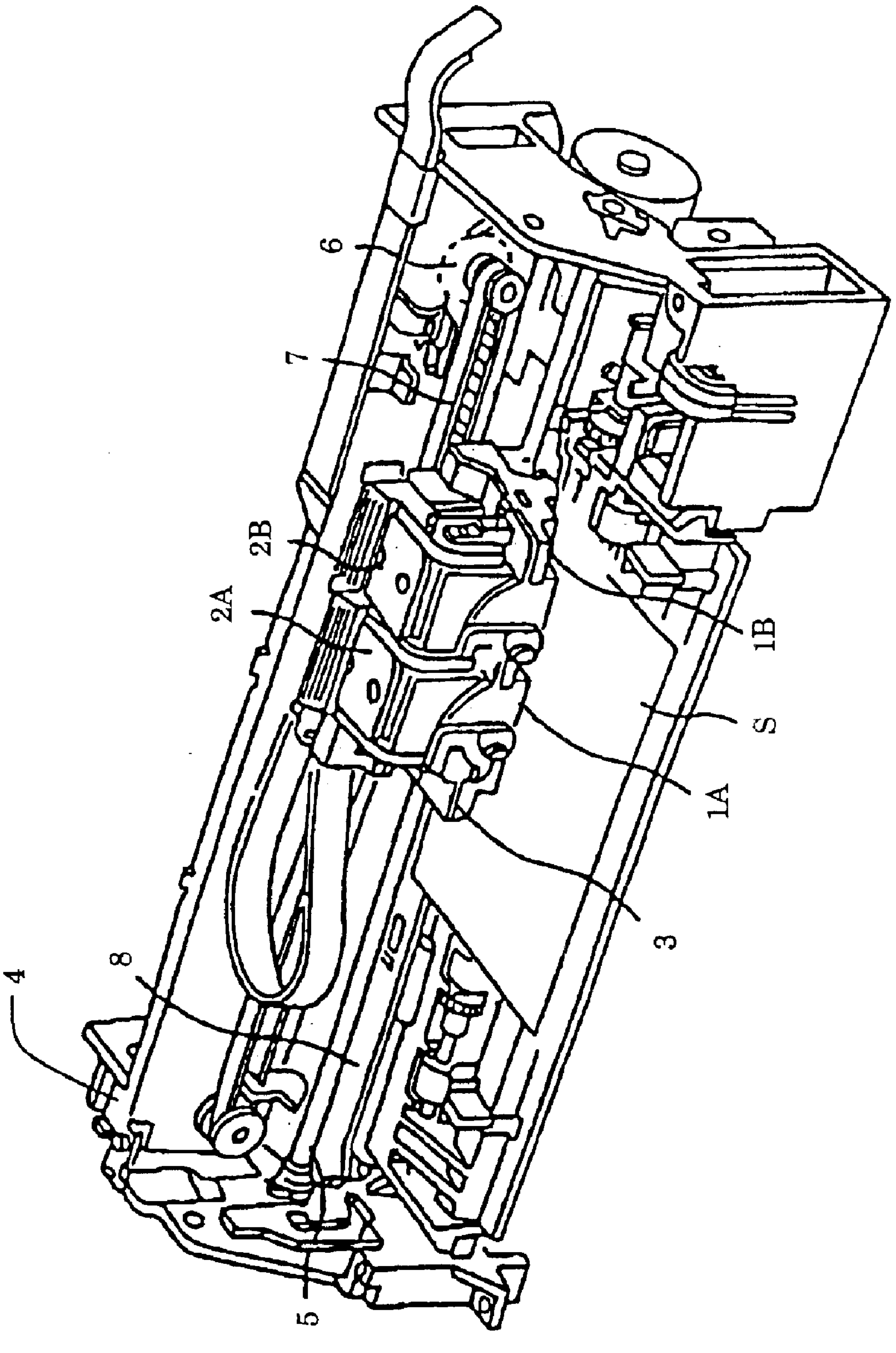
FIG. 10 is a schematic view of an ink-jet recording apparatus according to one embodiment of the present invention.

Meanwhile, the ink-jet recording head according to any of these embodiments constitutes part of a recording head unit which includes ink passages communicating with ink cartridges and the like, whereby the ink-jet recording head is installed in an ink-jet recording apparatus. FIG. 10 is a schematic view showing one example of such an ink-jet recording apparatus.

As shown in FIG. 10, cartridges 2A and 2B severally constituting ink supplying means are disposed detachably on recording head units 1A and 1B severally provided with the ink-jet recording heads. A carriage 3 carrying the recording head units 1A and 1B is provided as movable along an axial direction on a carriage shaft 5 fitted to an apparatus body 4. For example, the recording head units 1A and 1B are designed to eject a black ink composition and a color ink composition, respectively.

Moreover, driving power of a drive motor 6 is transferred to the carriage 3 through unillustrated gears and a timing belt 7, whereby the carriage 3 carrying the recording head units 1A and 1B is moved along the carriage shaft 5. Meanwhile, a platen 8 is provided on the apparatus body 4 along the carriage 3. The platen 8 is made rotatable by driving power of an unillustrated paper-feeding motor. Moreover, a recording sheet S, which is a recording medium such as paper fed by a paper-feeding roller or the like, is conveyed on the platen 8.

In the foregoing explanations, the ink-jet recording head for ejecting ink has been taken as an example of the liquid-jet head. However, it is to be understood that the present invention is generally applicable to wide ranges of liquid-jet heads and liquid-jet apparatuses.

Such applied liquid-jet heads may include, for example, a recording head for use in an image recording apparatus such as a printer, a color material-jet head for use in fabrication of a color filter of a liquid crystal display device and the like, an electrode material-jet head for use in formation of electrodes of an organic electroluminescent display device, a field emission display (FED) device and the like, and a bioorganic material-jet head for use in fabrication of a biochip.

As describe above, according to the present invention, the penetrated portion is formed on the vibration plate in the region opposite to the communicating path by laser processing. Accordingly, it is possible to form the penetrated portion favorably without generating cracks on the vibration plate. Therefore, it is possible to avoid imperfect eject such as occlusion of a nozzle by fragments of the vibration plate.

What is claimed is:

1. A method of fabricating a liquid-jet head including a passage-forming substrate on which a pressure-generating chamber communicating with a nozzle orifice is formed, a plurality of piezoelectric elements provided on one side of the passage-forming substrate via a vibration plate, each of the piezoelectric elements comprising a lower electrode, a piezoelectric layer and an upper electrode, the method comprising the steps of:

forming the vibration plate and the piezoelectric element on one side of the passage-forming substrate;

forming the pressure-generating chamber by patterning from another side of the passage-forming substrate and forming a communicating path to communicate with one end in a longitudinal direction of the pressure-generating chamber; and forming a penetrated portion for supplying a liquid to the communicating path in a region of the vibration plate opposite to the communicating path by laser processing; and a laser beam is irradiated on the vibration plate in the step of forming the penetrated portion to effectuate processing such that dross in a size within one-fourth of a diameter of the nozzle orifice, being formed when the elastic film and the lower electrode film is cutting away, is adhered in the periphery of the penetrated portion.

2. The method of fabricating a liquid-jet head according to claim 1, wherein a laser beam with a fundamental wavelength oscillated by a Q-switched YAG laser oscillator is irradiated on the vibration plate in the step of forming the penetrated portion.

3. The method of fabricating a liquid-jet head according to claim 1, wherein a laser beam with a higher harmonic wavelength oscillated by a Q-switched YAG laser oscillator is irradiated on the vibration plate in the step of forming the penetrated portion.

4. The method of fabricating a liquid-jet head according to claim 1, wherein a laser beam with a second harmonic wavelength oscillated by a Q-switched YAG laser oscillator is irradiated on the vibration plate in the step of forming the penetrated portion.

5. The method of fabricating a liquid-jet head according to claim 1, wherein the laser processing is performed underwater.

6. The method of fabricating a liquid-jet head according to claim 1, wherein a laser beam is irradiated on the vibration plate in a region corresponding to an open edge of the communicating path and the laser beam is scanned along the open edge of the communicating path in the step of forming the penetrated portion.

7. The method of a liquid-jet head according to claim 1, wherein a plurality of penetrated holes are formed on at least the vibration plate in a region opposite to the communicating path in the step of forming the penetrated portion.

8. The method of fabricating a liquid-jet head according to claim 1, before the step of forming the penetrated portion on the vibration plate, the method further comprising the step of:

bonding a reservoir-forming plate having a reservoir portion communicating with the communicating path via the penetrated portion, to the passage-forming substrate on a side where the piezoelectric element is formed.

9. A method of fabricating a liquid-jet head including a passage-forming substrate on which a pressure-generating chamber communicating with a nozzle orifice is formed, a plurality of piezoelectric elements provided on one side of the passage-forming substrate via a vibration plate, each of the piezoelectric elements comprising a lower electrode, a piezoelectric layer and an upper electrode, the method comprising the steps of:

forming the vibration plate and the piezoelectric element on one side of the passage-forming substrate;

forming the pressure-generating chamber by patterning from another side of the passage-forming substrate and forming a communicating path to communicate with one end in a longitudinal direction of the pressure-generating chamber; and forming a penetrated portion for supplying a liquid to the communicating path in a region of the vibration plate opposite to the communicating path by laser processing, wherein a laser beam is irradiated on the vibration plate in a region corresponding to an open edge of the communicating path and the laser beam is scanned along the open edge of the communicating path in the step of forming the penetrated portion.

10. The method of fabricating a liquid-jet head according to claim 9, wherein the laser beam is irradiated with a fundamental wavelength oscillated by a Q-switched YAG laser oscillator.

11. The method of fabricating a liquid-jet head according to claim 9, wherein the laser beam is irradiated with a higher harmonic wavelength oscillated by a Q-switched YAG laser oscillator.

12. The method of fabricating a liquid-jet head according to claim 9, wherein the laser beam is irradiated with a second harmonic wavelength oscillated by a Q-switched YAG laser oscillator.

13. The method of fabricating a liquid-jet head according to claim 9, wherein the laser processing is performed underwater.

14. The method of a liquid-jet head according to claim 9, wherein a plurality of penetrated holes are formed on at least the vibration plate in a region opposite to the communicating path in the step of forming the penetrated portion.

15. The method of fabricating a liquid-jet head according to claim 9, before the step of forming the penetrated portion on the vibration plate, the method further comprising the step of:

bonding a reservoir-forming plate having a reservoir portion communicating with the communicating path via the penetrated portion, to the passage-forming substrate on a side where the piezoelectric element is formed.

16. The method of fabricating a liquid-jet head according to claim 9, wherein the laser beam is irradiated to effectuate processing such that dross in a size within one-fourth of a diameter of the nozzle orifice, being formed when the elastic film and the lower electrode film is cutting away, is adhered in the periphery of the penetrated portion.

* * * * *